Oct. 31, 1950   J. KOLAR   2,528,441
AXIAL OPERATED FLUSH TANK VALVE
Filed July 23, 1949
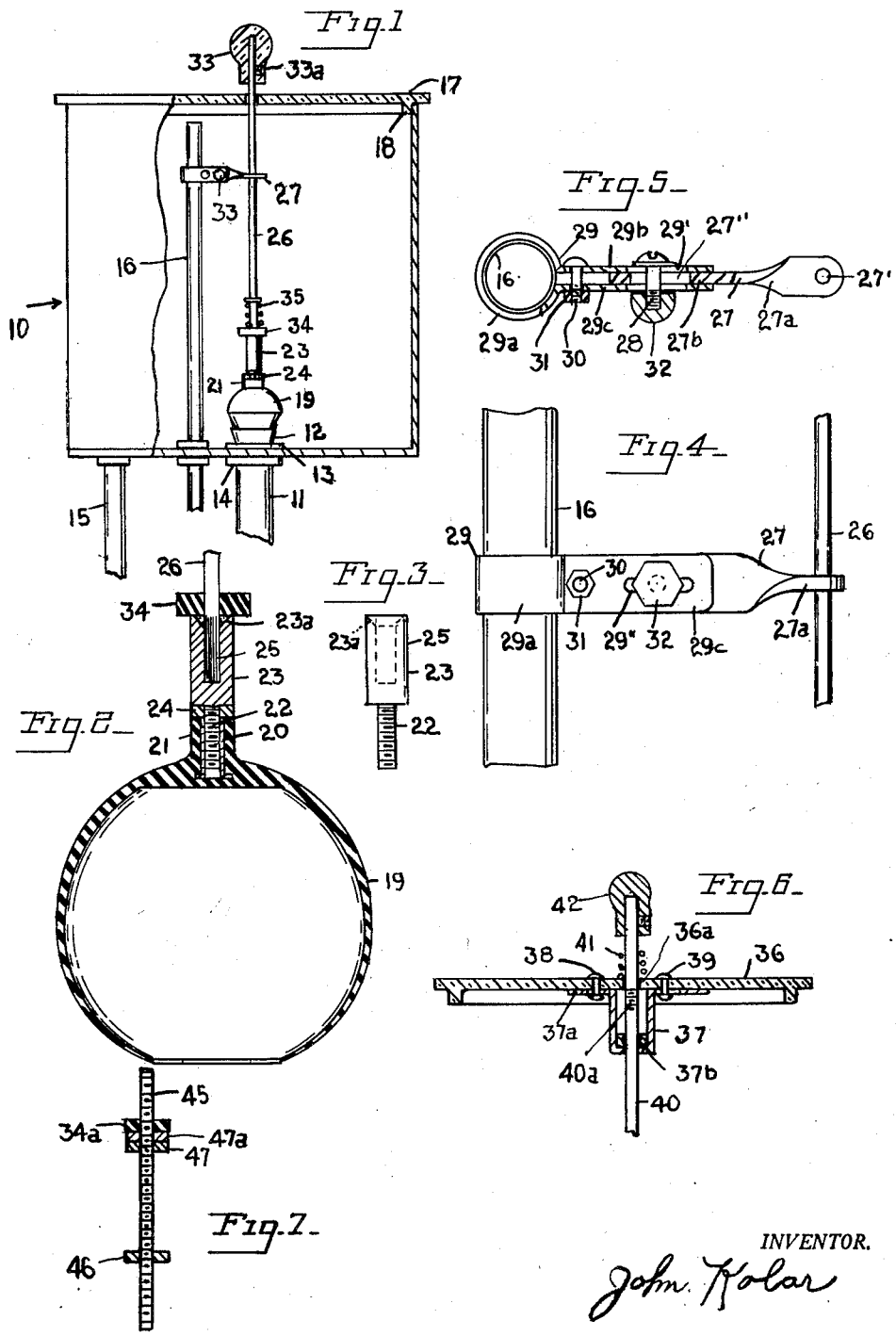
INVENTOR.
John Kolar Patented Oct. 31, 1950

2,528,441

UNITED STATES PATENT OFFICE 2,528,441

AXIAL OPERATED FLUSH TANK VALVE

John Kolar, Jersey City, N. J.

Application July 23, 1949, Serial No. 106,340

3 Claims. (Cl. 4—56)

This invention relates to an improvement in ball valves for closet flush tanks, and one of the objects of the invention is to provide a flush tank with a ball for closing the discharge opening of the flush pipe, which will operate on a direct pull through the cover of the tank, and thus permit of the elimination of levers and mechanism between the pull rod and the ball valve, and simplify both installation and replacement costs and operations.

Another object of the invention is to provide a ball valve for flush tanks with a single operating and centering rod coupled thereto, a guide adjustably supported to center the valve rod, and a knob detachable from the rod, to permit the valve rod being extended through a hole formed in the cover in line with the axis of the ball valve seat, so that the cover and the guide will combine to hold the valve rod centered with reference to the ball valve seat, and the ball valve may be lifted by a direct pull on the valve rod.

A further object of the invention is to provide a coupling between the ball valve rod and the ball valve, which will permit of the use of rods of different lengths, so that the unit can be adapted for any type of flush tank.

With the above and other objects in view the invention comprises certain new and useful constructions, combinations and arrangements of parts, clearly described in the following specification, and fully illustrated in the drawings, in which:

Fig. 1 is a vertical sectional view through a flush tank provided with my improved direct pull ball valve.

Fig. 2 is a vertical sectional view, taken through the ball valve and the coupling between the valve and its rod, on an enlarged scale.

Fig. 3 is a detail side view of the coupling.

Fig. 4 is a detail side elevation, enlarged, showing the adjustable guide.

Fig. 5 is a top plan view, partly in horizontal section, enlarged, showing the adjustable strap guide for the valve rod.

Fig. 6 is a detail sectional view of a modified guide, shown mounted directly on the cover.

Fig. 7 is a fragmentary sectional view of the lower end of the valve rod of a modified form.

Referring to the accompanying drawings, which illustrate the practical embodiment of the invention, 10 designates a conventional flush tank, having the usual flush pipe 11, provided with a tapered valve seat 12, and which is coupled to the bottom of the tank by means of the nuts 13 and 14. The usual water supply tank pipe 15 is also connected to the bottom and extends into the tank and is controlled by the usual float valve mechanism not shown. An air pipe 16 also extends through the tank bottom to a point or level near the cover 17 of the tank, and this cover is shown to be provided with an internal flange 18, designed to center the cover on the open upper end of the tank.

A hollow rubber ball valve 19 is provided for closing the intake of the flush pipe 11, and for this purpose engages the tapered seat 12 of this flush or discharge pipe. This rubber ball valve is provided with a tubular screw 20, which is embedded in the neck 21 of the ball valve. The male screw 22 of the coupling 23 is threaded into the female or tubular screw 20, and a lock nut 24 is threaded on the male screw 22 against the upper end of the neck 21, so as to prevent accidental uncoupling of the male screw.

The upper end of the coupling 23 is formed with an unthreaded longitudinal bore 25, which is adapted to receive the lower end of the valve rod 26, which is also unthreaded. The upper end of the coupling 23 is also formed with a conical recess 23a in which solder is deposited, so as to effectively unite the valve rod 26 to the coupling, and to provide a flat bearing surface for the upper end of the coupling.

The rod 26 is held centered with reference to the valve seat 12, by means of the guide arm 27. This guide arm has an outer portion 27a, formed with a hole 27' through which the valve rod 26 slides, which is disposed in a horizontal plane, and an inner portion 27b, which is formed with a longitudinal slot 27'' through which the binding screw 28 extends. This screw also passes through the U-shaped clamp 29, having the split holding clamp ring 29a and the parallel gripping jaws 29b and 29c, which extend from the split ring 29a. The split ring 29a is clamped to the air vent pipe 16 by means of the screw 30 and the cooperating nut 31, and a nut 32 is threaded on the screw 28 to clamp the inner leg or portion 27b between and to the gripping jaws 29b and 29c.

The split ring may be swung around the vent pipe and the outer portion 27a of the guide may be moved outwardly of the pipe or inwardly thereof, so that the bearing hole 27' may be exactly centered with reference to the axis of the tapered ball valve seat.

The valve rod 26 extends in a vertical plane above the guide and through a bearing hole formed in the cover. On the upper end of this valve rod a pull knob 33 is mounted, and this is held in place by means of the set screw 33a, which is engaged with the side of the valve rod 26. This knob is axially aligned with the ball valve and its seat, so that a direct axial pull on the knob will lift the rubber ball valve from its seat, and thereby release the stored up water of the flush tank, to discharge through the flush pipe into the toilet bowl, not shown.

To absorb the shock caused by lifting the ball valve from its seat and moving it toward the guide, I prefer to use a rubber spring or washer 34 on the valve rod 26, against the coupling thereof, and may also use a compression coil spring 35 with this rubber washer.

My device is particularly designed to reduce replacement costs for buildings or multiple apartments, and to provide a direct axial operation of the ball valve, which will insure of positive unseating of the valve, and positive seating of the valve. By applying manual pressure on the upper end of the valve rod, against its knob, the ball valve may be forced to its seat, so as to prevent vibration of the valve and leaking of water from the flush tank.

In Fig. 6 I show a cover 36, having a U-shaped guide 37 secured thereto, against the inner face of the same, by the fasteners 38 and 39. This cover may be made of porcelain, plastic or any suitable material, and the guide 37 is formed with horizontal feet 37a, which are longitudinally slotted, so that the guide may be adjusted with reference to the cover. After the guide has been axially centered with reference to the tapered valve seat, the bearing hole 36a of the cover may be formed, by a suitable carbide drill, or otherwise.

As flush tanks have different depths, and a plumber cannot know in advance the exact depth of a tank which requires replacement of working parts, the coupling and the knob can be attached to the valve rod, after the required length of rod stock has been cut from a rod of greater length.

When the ball valve unit is used on a boat and the water in the tank is subjected to agitation, it is desirable that the ball valve be locked to its seat. The guide 37 is provided with a nut 37b which is engaged by the screw thread 40a formed on the valve rod 40, when this rod is forced downwardly, against the tension of the coil spring 41, disposed between the cover and the knob 42. When the screw thread 40a is coupled to the nut 37b the valve rod and its ball valve will be held downward with the ball valve closing the valve seat.

It is understood that various changes in the details of construction, their combination and arrangement, may be made in carrying out the invention, defined by the claims hereof.

In Fig. 7 I show a modified form of the valve rod, wherein the rod 45 is shown with an extended screw thread, on which the lower lock nut 46 is threaded to lock the valve ball thereto. Above the lock nut 46 a nut 47 is threaded and against this nut another lock nut 47a is threaded, and on the lock nut 47a the washer 34a is disposed to act as a shock absorber, this washer being made of rubber.

Having described the invention I claim as new:

1. A toilet bowl flush tank having a bottom wall provided with a discharge pipe vertically disposed therein and provided on its upper end with a tapered valve seat enclosed by the tank above said bottom wall, a cover for said tank detachable therefrom and provided with an axial hole aligned with the center of the valve seat, a hollow rubber ball valve disposed in said seat and provided with an axial neck having a tubular screw therein, a rod slidable through the cover, a coupling having a tubular upper end soldered to the lower end of the rod and provided with a male screw threaded in the tubular screw, a lock nut threaded on the male screw against the end of the neck of the ball valve, an air vent pipe disposed in said flush tank in parallel relation to the discharge pipe, a guide having a hole through which the rod slidably extends, and a split ring clamped to the air vent pipe and having adjustable connection with the guide, whereby said guide hole may be axially centered with the valve seat.

2. In combination with the flush tank of a toilet bowl, a discharge pipe having its upper end extending above the bottom of the tank and provided with a tapered valve seat, a cover for said tank having a bearing hole axially aligned with the valve seat, a hollow rubber ball valve disposed on the seat and provided with a neck having an internal tubular screw, a coupling having a male screw coupled with the tubular screw and provided with a tubular upper end and a tapered end recess, a rod inserted in said tubular upper end and connected thereto by solder deposited in said tapered end recess, a guide supported in the tank and provided with a hole disposed in axial alignment with the valve seat, means for adjusting the guide in the tank, the upper end of the rod sliding through the bearing hole of the cover, and a knob detachably connected with the upper end of the rod to permit of an axial pull on the ball valve to lift it from its seat and direct manual pressure to force it to its seat.

3. In combination with the flush tank of a toilet bowl having a discharge pipe extending through the bottom thereof, said discharge pipe having a tapered valve seat on its upper end, a cover for said tank having a bearing hole aligned axially with the tapered valve seat, a support in said tank, a split ring clamped to said support, said split ring having parallel jaws extending from said ring and provided with longitudinal slots, a guide member between the jaws, a screw extending through the slots and the guide member, the outer end of the guide member having a vertical bearing hole alignable with the bearing hole of the cover and the axis of the valve seat, a rod slidable through the bearing hole of the cover and the bearing hole of the guide, a hollow rubber ball valve having a neck detachably coupled to the lower end of the rod, a lock nut for holding said rod so coupled, a rubber washer on said rod against the lock nut and adapted to provide a yielding stop to engage the guide, and a knob detachably connected with the upper end of the rod for manually lifting the ball valve by an axial movement thereof.

JOHN KOLAR.

REFERENCES CITED

The following references are of record in the file of this patent:

UNITED STATES PATENTS

| Number | Name | Date |
|---|---|---|
| 449,242 | Beekman et al. | Mar. 31, 1891 |
| 1,214,920 | Douglas | Jan. 30, 1917 |
| 1,577,723 | Katzin | Mar. 23, 1926 |
| 1,777,553 | Crane | Oct. 7, 1930 |
| 2,004,504 | Lyons | June 11, 1935 |

FOREIGN PATENTS

| Number | Country | Date |
|---|---|---|
| 20,651 | Great Britain | Oct. 12, 1905 |